US008161613B2

(12) United States Patent
Schuele et al.

(10) Patent No.: US 8,161,613 B2
(45) Date of Patent: Apr. 24, 2012

(54) METHOD AND DEVICE FOR PRODUCING SCREW CONNECTIONS

(75) Inventors: Manfred Schuele, Sulzbach-Laufen (DE); Mike Voigt, Gaildorf (DE)

(73) Assignee: Robert Bosch GmbH, Stuttgart (DE)

( * ) Notice: Subject to any disclaimer, the term of this patent is extended or adjusted under 35 U.S.C. 154(b) by 1246 days.

(21) Appl. No.: 10/579,960

(22) PCT Filed: Mar. 4, 2005

(86) PCT No.: PCT/EP2005/050965

§ 371 (c)(1), (2), (4) Date: May 19, 2006

(87) PCT Pub. No.: WO2005/108013

PCT Pub. Date: Nov. 17, 2005

(65) Prior Publication Data

US 2007/0095154 A1 May 3, 2007

(30) Foreign Application Priority Data

May 3, 2004 (DE) ......................... 10 2004 021 536

(51) Int. Cl.
*B23Q 17/00* (2006.01)

(52) U.S. Cl. ..... 29/407.01; 29/707; 173/176; 73/862.08

(58) Field of Classification Search ............... 29/407.01, 29/407.02, 407.03, 407.05, 407.09, 407.1, 29/709, 714, 706, 707, 708; 173/176, 181, 173/182, 183, 1, 5, 6, 180; 81/467, 469; 73/862.08, 862.21, 862.23

See application file for complete search history.

(56) References Cited

U.S. PATENT DOCUMENTS

| | | | | | |
|---|---|---|---|---|---|
| 4,571,696 | A * | 2/1986 | Bitzer | 700/253 |
| 4,787,136 | A * | 11/1988 | Majic | 29/709 |
| 5,289,885 | A * | 3/1994 | Sakoh | 173/2 |
| 5,366,026 | A * | 11/1994 | Maruyama et al. | 173/180 |
| 5,650,574 | A * | 7/1997 | Sato et al. | 73/862.23 |
| 5,715,894 | A * | 2/1998 | Maruyama et al. | 173/180 |
| 6,405,598 | B1 * | 6/2002 | Bareggi | 73/761 |
| 6,892,826 | B2 * | 5/2005 | Giardino | 173/1 |
| 2003/0149508 | A1 * | 8/2003 | Watanabe | 700/168 |
| 2003/0173096 | A1 * | 9/2003 | Setton et al. | 173/176 |
| 2004/0050566 | A1 * | 3/2004 | Totsu | 173/2 |

FOREIGN PATENT DOCUMENTS

| | | |
|---|---|---|
| DE | 199 61 374 | 6/2001 |
| DE | 101 27 821 | 7/2002 |
| DE | 101 33 923 | 1/2003 |
| EP | 0 399 637 | 11/1990 |
| EP | 1 068 931 | 1/2001 |
| JP | 63-123642 | 5/1988 |
| JP | 4-75881 | 3/1992 |
| JP | 5-293725 | 11/1993 |
| JP | 7-105469 | 4/1995 |
| JP | 7-164343 | 6/1995 |
| JP | 2002-39885 | 2/2002 |
| JP | 2003-53678 | 2/2003 |
| WO | 02/085568 | 10/2002 |

* cited by examiner

*Primary Examiner* — David Bryant
*Assistant Examiner* — Christopher Koehler
(74) *Attorney, Agent, or Firm* — Michael J. Striker

(57) ABSTRACT

The invention is based on a method for producing a screw connection by means of a cutout screwdriver (10) that terminates a screw driving operation when a predetermined torque is achieved.
According to the invention, data relating to an operation are detected in the cutout screwdriver (10) and transmitted to an external monitoring unit (20). The invention also discloses a device for executing the method as well as a cutout screwdriver.

17 Claims, 1 Drawing Sheet

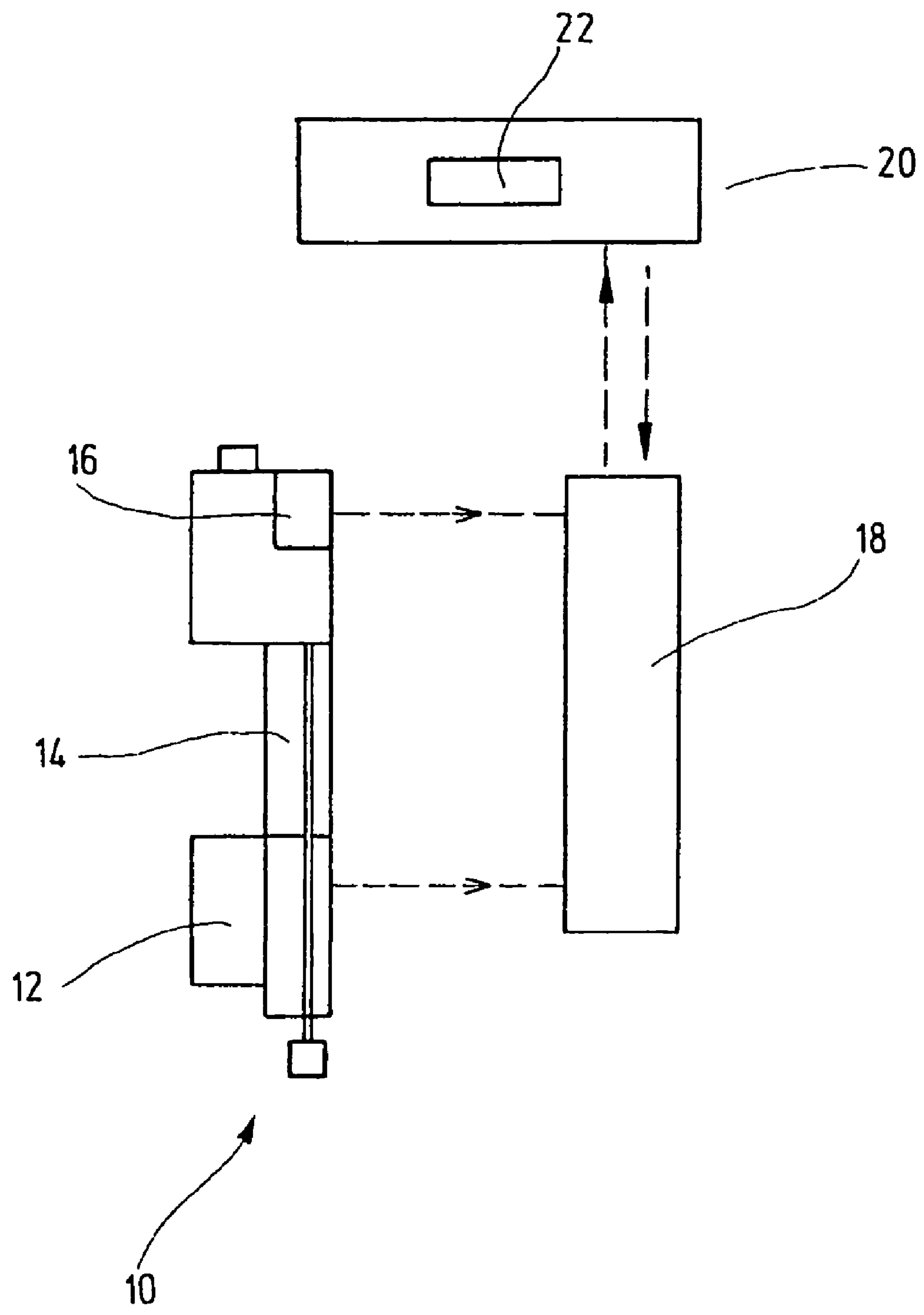
22
20
16
18
14
12
10

METHOD AND DEVICE FOR PRODUCING SCREW CONNECTIONS

PRIOR ART

The invention is based on a method and device according to the preambles to claims 1 and 8.

Proposals have already been made to measure, monitor, and document the torque achieved by electrically driven and electronically controlled screwdrivers. To this end, the controllable screwdrivers have means, in particular torque sensors and/or rotation angle sensors that detect the measurement values and supply them to a regulation circuit. Depending on the parameters measured, the screw driving process is automatically terminated when the predetermined values are achieved. There are also known cutout screwdrivers that are deactivated by means of a mechanical clutch.

Screwdrivers of this kind are used on a large scale in industrial production. Since it is frequently the case that numerous screw driving operations must be performed in many production steps of the production process, there is the danger of some screw driving operations being inadvertently omitted. Monitoring the correct execution of screw driving operations can be achieved by counting the number of correct screw driving operations per screw driving cycle, e.g. per production step or per component, but this requires detection of the screw driving procedures. It is therefore necessary to differentiate between correctly executed screw driving operations and an idle screwdriver actuation in which the operator does in fact actuate the starting switch of the screwdriver, but without screwing in a screw. An idle screwdriver actuation of this kind can occur, for example, between two screw driving procedures, when the operator tests the functionality of the screwdriver or inadvertently actuates the start switch. An idle screwdriver actuation can also occur if the screw driving procedure is prematurely terminated.

ADVANTAGES OF THE INVENTION

The invention is based on a method for producing a screw connection by means of a cutout screwdriver that terminates a screw driving operation when a predetermined torque is achieved.

According to the present invention, data relating to an operation are detected in the cutout screwdriver and transmitted to an external monitoring unit. Preferably, operating data are collected internally in the cutout screwdriver and transmitted to the external monitoring unit. It is suitable for this to occur by means of radio transmission. A transmission via cable, however, is also conceivable. If the data lie outside a tolerance range, then an error message can be issued and in particular, the cutout screwdriver can be deactivated.

If the data are detected and/or evaluated by means of an evaluation circuit and transmitted to the monitoring unit, if the monitoring unit receives the transmitted data and evaluates them with regard to predetermined limit values, and if, when the data do not comply with the limit values, an error message is generated, then a reliable quality control of the cutout screwdriver can be achieved, particularly in a production process on an assembly line. Preferably, the error message is constituted by the deactivation of the cutout screwdriver.

Preferably, data relating to the operation, in particular relating to correctly executed screw driving operations and those not executed, are detected, and, in the event that a number of screw driving operations lie outside a tolerance range, the cutout screwdriver is deactivated. This has the advantage that the deactivation of the cutout screwdriver prevents the operator from continuing work until the error in the screw driving cycle has been rectified. This improves quality control and reduces the amount of waste due to unsuccessful screw driving operations. Preferably, the data are detected by means of an evaluation circuit and transmitted to a monitoring unit, in particular an external monitoring unit situated apart from the cutout screwdriver. Preferably, the evaluation circuit detects and evaluates whether or not a screw driving operation has been successfully executed. For example, the evaluation circuit sends the monitoring unit a “screw driving operation correct” or “screw driving operation incorrect” signal. The monitoring unit detects the data and evaluates them with regard to predetermined limit values. If the data lie outside the tolerance range, then a corresponding signal is sent to the cutout screwdriver.

It is also optionally or additionally possible for other data deemed useful to those skilled in the art to be transmitted from the cutout screwdriver to the monitoring unit, in particular operating data of the cutout screwdriver, such as whether a screw driving operation has been completed, whether a screw driving operation was correct or incorrect, and/or the time and/or date when a screw driving operation was carried out, and/or a duration of the screw driving procedure, and/or a duration of an entire cycle, e.g. a certain number of screw driving operations per screw driving cycle, and/or limit values of a current consumption and/or voltage drop during the screw driving operation as a measure for the quality of the screw driving operation, and/or information regarding a loosening or tightening of a screw, i.e. by an actuation of the clockwise or counterclockwise operation of the cutout screwdriver. It is also advantageous to switch off and/or deactivate the cutout screwdriver when it is taken out of an operating range of the external monitoring unit or to activate the cutout screwdriver when it is brought into the operating range of the monitoring unit. It is useful for the cutout screwdriver to log onto the monitoring unit by transmitting a signal.

Detecting the data in an external monitoring unit that is coupled, for example, to a computer makes it is possible for the data to be detected and evaluated in an on-line fashion. Through comparison with certain limit value criteria, the quality of screw driving operations, for example, is checked and, when limit value criteria are not met, a correction of the screw driving operations is required.

It is possible for a torque sensor in the cutout screwdriver to detect current torques and transmit them to the evaluation circuit, which, based on whether a desired torque has been achieved or not, determines whether a screw driving operation has been executed correctly. If the duration of a usual screw driving operation is known, then the duration for the screw driving operation can be used as a criterion for assessing whether or not a screw driving operation has been successfully performed. If no screw driving operation is detected after a predetermined amount of time, i.e. the cutout screwdriver does not switch off or switches off too late, then this can indicate an incorrect screw driving operation. On the other hand, if the cutout screwdriver switches off too early, then this can also indicate an incorrect screw driving operation. These data are preferably transmitted to the monitoring unit. It is also possible to use other measurement values deemed appropriate to detect an incorrect screw driving operation.

It is useful for the number of screw driving operations per screw driving cycle to be detected in the evaluation circuit. In an advantageous modification, the duration of the screw driving operation is detected in the evaluation circuit. Optionally or additionally, the current consumption and voltage drop of the cutout screwdriver during a screw driving operation can be detected in the evaluation circuit. It is particularly preferable not only to detect these data, but also to evaluate them as either correct or incorrect.

Preferably, the detected and evaluated data of the evaluation circuit are transmitted to the external monitoring unit by means of a transmitter. One advantage of an external monitoring unit is that a single monitoring unit can be used to monitor a multitude of cutout screwdrivers, in particular cordlessly operated cutout screwdrivers, which is an advantage, for example, in a production line. To this end, each of the multitude of monitored cutout screwdrivers has a corresponding code for unique identification, which is known to the monitoring unit. It is also conceivable, however, for the cutout screwdriver to be connected to the monitoring unit via a cable and for data to be transmitted between the cutout screwdriver and the monitoring unit via the cable. If need be, the cable can also be used to supply current to the cutout screwdriver.

Preferably, limit values for the data transmitted from the evaluation circuit are stored in the monitoring unit, with which the transmitted data are compared and evaluated. When limit value criteria are not met, the monitoring unit sends the cutout screwdriver a signal that deactivates the cutout screwdriver.

The present invention also proposes a device for carrying out a method in which a cutout screwdriver is connected to an evaluation circuit that is coupled via a transmitter to an external monitoring unit. Preferably, the cutout screwdriver has a receiver, which, in conjunction with a transmitted signal, interrupts the supply of current to the cutout screwdriver.

Preferably, the monitoring unit has a transmitter/receiver system that receives the data transmitted from the evaluation circuit and transmits a deactivation signal to the cutout screwdriver. In particular, the transmitter/receiver system of the monitoring unit can communicate with a transmitter/receiver system of the cutout screwdriver.

It is advantageous if the monitoring unit has an evaluation unit in which the data transmitted from the evaluation circuit are stored, compared with limit values for the transmitted data, and evaluated. When limit value criteria are not met, the evaluation unit sends the cutout screwdriver a signal that causes a control unit to disconnect the supply of current to the cutout screwdriver. Preferably, the evaluation unit is a computer that processes the data in an on-line fashion.

The present invention is particularly suitable for cordless cutout screwdrivers and is particularly advantageous for cordless screwdrivers used in industrial applications.

DRAWINGS

Independent of the combinations in which they appear in the claims and without limitation to their general applicability, other embodiment forms, aspects, and advantages of the present invention also ensue from the exemplary embodiments of the invention described below in conjunction with the drawing.

FIG. 1 schematically depicts the design of an exemplary embodiment of a device according to the present invention.

DESCRIPTION OF THE EXEMPLARY EMBODIMENT

FIG. 1 depicts a device in which a cutoff screwdriver 10 is embodied in the form of a cordless cutout screwdriver. The cutout screwdriver 10 has a torque sensor 12 for detecting the torque of the motor 14. The cutout screwdriver 10 also has a control unit 16 that switches the motor 14 on or off and prompts the motor 14 to execute a clockwise or counterclockwise operation. It is also optionally possible for the control unit to control the output and speed of the motor 14.

The torque sensor 12 and control unit 16 are connected to an evaluation circuit 18 that is only indicated here; in particular, the evaluation circuit 18 can be integrated into the cutout screwdriver 10. The evaluation circuit 18 detects and decides whether or not a screw driving operation has been correctly executed and sends a corresponding signal to an external monitoring unit 20. It is optionally possible for the evaluation circuit 18 to detect and decide whether or not other operating data of the cutout screwdriver 10 are correct.

The torque rises as the screw driving operation continues such that at the moment at which the head of the screw comes into contact with the parts to be joined, the torque increases. The torque increases to a desired torque at which the cutout screwdriver 10 should be deactivated. By means of the evaluation circuit 18, the current data are detected and evaluated as "screw driving operation correct" or "screw driving operation incorrect".

If the cutout screwdriver 10 is functioning in idle mode, then the idle mode is associated with a particular idle torque that is less than the desired torque.

If the final torque of the cutout screwdriver 10 is less than the desired torque, then an idle screwdriver actuation is occurring, which is counted in the evaluation circuit 18 and evaluated as incorrect. If the desired torque is achieved, then a correct screw driving is occurring, which the evaluation circuit 18 likewise detects and evaluates to be a correct screw driving operation.

In addition, the evaluation circuit 18 detects the duration of the screw driving operation as well as the current consumption and voltage drop during the screw driving operation.

A transmitter in the evaluation circuit 18 transmits the detected and evaluated data to an external monitoring unit 20. The monitoring unit 20 has an evaluation unit 22 equipped with a transmitter/receiver system that is able to receive the data transmitted from the evaluation circuit 18 and to transmit, as needed, a deactivation signal to the cutout screwdriver 10. For example, the evaluation unit 22 is a computer that processes the data in an on-line fashion.

The evaluation unit 22 of the monitoring unit 20 stores the data transmitted from the evaluation circuit 18. The transmitted data are compared to limit values stored in the evaluation unit 22 and evaluated.

If limit value criteria are not met, then the evaluation unit 22 sends the cutout screwdriver 10 a signal, which causes the control unit 16 to interrupt the supply of current in the cutout screwdriver 10.

For example, if the number of idle screwdriver actuations exceeds a predetermined limit value per screw driving cycle, then the cutout screwdriver 10 is deactivated. If the limit values from current consumption to voltage drop are not achieved during the screw driving operation, which represents a measure for the quality of the screw driving operation, then the cutout screwdriver 10 is deactivated and the operation is interrupted. The control unit 16 allows the operator to continue the screw driving operation, but only permits successful completion of the screw driving cycle if the error has been rectified. If the error source has not been remedied, then the monitoring unit 20 deactivates the cutout screwdriver 10 again.

It is also possible for the cutout screwdriver 10 to be deactivated when it is taken out of the operating range of the monitoring unit 20 and for it to be activated when it is brought into the operating range of the monitoring unit 20.

What is claimed is:

1. A method for producing a screw connection by a cordless cutout screwdriver (10) comprising an evaluation unit (18), which cordless cutout screwdriver (10) terminates a screw driving operation when a predetermined torque is achieved, comprising:
  - detecting and evaluating data relating to the operation using the evaluation circuit (18),
  - transmitting the data to an external monitoring unit (20), and
  - deactivating the cutout screwdriver (10) when a number of idle screwdriver actuations exceeds a predetermined limit value per screw driving cycle.

2. The method as recited in claim 1, wherein the monitoring unit (20) receives and evaluates the transmitted data with regard to predetermined limit values, and, when the predetermined limit values are not met, generates an error message.

3. The method as recited in claim 1, further comprising deactivating the cutout screwdriver (10) if the data are evaluated as being outside a tolerance range.

4. The method as recited in claim 1, further comprising detecting a current torque by use of a torque sensor (12) in the cutout screwdriver (10) and transmitting the detected current torque to the evaluation circuit (18).

5. The method as recited in claim 4, wherein the evaluation circuit (18), based on the achievement of a desired torque, determines whether a correct screw driving operation has been executed.

6. The method as recited in claim 1, wherein the evaluation circuit (18) detects the number of screw driving operations per screw driving cycle.

7. The method as recited in claim 1, wherein the evaluation circuit (18) detects the duration of a screw driving procedure.

8. The method as recited in claim 1, wherein the evaluation circuit (18) detects the current consumption and/or voltage drop of the cutout screwdriver during the screw driving operation.

9. The method as recited in claim 1, wherein limit values for the data transmitted from the evaluation circuit (18) are stored in the monitoring unit (20), with which the transmitted data are compared and evaluated, and when limit value criteria are not met, the monitoring unit (20) sends the cutout screwdriver (10) a signal that causes the supply of current to the cutout screwdriver (10) to be interrupted.

10. The method as recited in claim 1, wherein the evaluation circuit (18) is coupled to the monitoring unit (20).

11. The method as recited in claim 10, wherein the cutout screwdriver (10) has a transmitter/receiver system, which, in conjunction with a transmitted signal, is able to interrupt a supply of current to the cutout screwdriver (10).

12. The method as recited in claim 10, wherein the monitoring unit (20) has a transmitter/receiver system that is able to receive data transmitted from the evaluation circuit (18) and to send a deactivation signal to the cutout screwdriver (10).

13. The method as recited in claim 11, wherein the monitoring unit (20) has an evaluation unit (22) in which the data transmitted from the evaluation circuit (18) are stored, compared with limit values for the transmitted data, and evaluated, and, when limit value criteria are not met, the evaluation unit sends the cutout screwdriver (10) a signal that permits a control unit (16) to interrupt the supply.

14. A cutout screwdriver equipped with a transmitter/receiver unit for executing the method as recited in claim 1.

15. A cutout screwdriver, comprising:
  - a cutout screwdriver device (10) comprising an evaluation circuit (18); and
  - an external monitoring unit (20),
  - wherein the evaluation circuit (18) detects and evaluates data relating to an operation of the cutout screwdriver device (10) and then transmits the evaluated data to the external monitoring unit (20), and
  - wherein the cutout screwdriver (10) is deactivated when a number of idle screwdriver actuations exceeds a predetermined limit value per screw driving cycle.

16. The method as recited in claim 15, wherein the evaluation circuit (18) detects the number of screw driving operations per screw driving cycle.

17. A method for producing a screw connection by a cordless cutout screwdriver (10) comprising an evaluation unit (18), which cordless cutout screwdriver (10) terminates a screw driving operation when a predetermined torque is achieved, comprising:
  - detecting and evaluating data relating to the operation using the evaluation circuit (18), including current consumption and/or voltage drop during the screw driving operation, and transmitting the data to an external monitoring unit (20),
  - evaluating the data received by the external monitoring unit (20), including comparing the data with stored predetermined limit values and generating and sending a signal to the output screwdriver (10) that causes the supply of current thereto to be interrupted in a case wherein the predetermined limit values are not met, and
  - deactivating the cutout screwdriver (10) when a number of idle screwdriver actuations exceeds a predetermined limit value per screw driving cycle.

* * * * *